(12) United States Patent
Ryu et al.

(10) Patent No.: US 11,889,497 B2
(45) Date of Patent: Jan. 30, 2024

(54) SCHEDULING SIDELINK COMMUNICATIONS

(71) Applicant: QUALCOMM Incorporated, San Diego, CA (US)

(72) Inventors: Jung Ho Ryu, Fort Lee, NJ (US); Wooseok Nam, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 17/443,911

(22) Filed: Jul. 28, 2021

(65) Prior Publication Data

US 2023/0032708 A1    Feb. 2, 2023

(51) Int. Cl.
*H04W 72/20*    (2023.01)
*H04W 72/1263*    (2023.01)
*H04W 76/28*    (2018.01)

(52) U.S. Cl.
CPC ....... *H04W 72/1263* (2013.01); *H04W 72/20* (2023.01); *H04W 76/28* (2018.02)

(58) Field of Classification Search
None
See application file for complete search history.

(56) References Cited

U.S. PATENT DOCUMENTS

| | | | |
|---|---|---|---|
| 2020/0053647 A1 | 2/2020 | Chae et al. | |
| 2021/0045056 A1* | 2/2021 | Nam | H04W 52/0216 |
| 2021/0058866 A1* | 2/2021 | Hosseini | H04W 52/0235 |
| 2021/0204217 A1* | 7/2021 | Balasubramanian | H04W 72/04 |
| 2022/0022279 A1* | 1/2022 | Kim | H04W 72/23 |
| 2022/0078879 A1* | 3/2022 | Nimbalker | H04W 76/28 |
| 2022/0182938 A1* | 6/2022 | Ye | H04W 52/0232 |
| 2022/0210739 A1* | 6/2022 | Yi | H04L 5/0042 |
| 2022/0256464 A1* | 8/2022 | Zhao | H04W 72/02 |
| 2022/0346180 A1* | 10/2022 | Tseng | H04W 76/14 |
| 2023/0055280 A1* | 2/2023 | Hwang | H04W 52/02 |
| 2023/0063472 A1* | 3/2023 | Freda | H04W 76/28 |

(Continued)

FOREIGN PATENT DOCUMENTS

| | | | | |
|---|---|---|---|---|
| EP | 3780891 A1 | 2/2021 | | |
| WO | WO-2020130930 A1 * | 6/2020 | ........ | H04W 52/0216 |
| WO | WO-2020205652 A1 * | 10/2020 | ........... | H04L 1/1812 |

(Continued)

OTHER PUBLICATIONS

International Search Report and Written Opinion—PCT/US2022/073847—ISA/EPO—dated Oct. 26, 2022.

*Primary Examiner* — Kodzovi Acolatse
(74) *Attorney, Agent, or Firm* — Harrity & Harrity, LLP

(57) ABSTRACT

Various aspects of the present disclosure generally relate to wireless communication. In some aspects, a user equipment (UE) may transmit information indicating a set of resources associated with periodic sidelink monitoring, the information indicating at least one first period of time during which the UE will remain awake and monitor for signals and at least one second period of time during which the UE will be in a sleep mode and not monitoring for signals. The UE may monitor for signals using at least one resource indicated by the information and during the at least one first period of time. Numerous other aspects are described.

30 Claims, 10 Drawing Sheets

(56) References Cited

U.S. PATENT DOCUMENTS

2023/0066448 A1* 3/2023 Tseng .................... H04W 76/28

FOREIGN PATENT DOCUMENTS

| WO | 2021098100 A1 | 5/2021 | |
|---|---|---|---|
| WO | 2021138789 A1 | 7/2021 | |
| WO | WO-2021243600 A1 * | 12/2021 | ........ H04W 52/0248 |
| WO | WO-2022013717 A2 * | 1/2022 | |
| WO | WO-2022019629 A1 * | 1/2022 | |
| WO | WO-2022069475 A2 * | 4/2022 | |
| WO | WO-2022086427 A1 * | 4/2022 | |

\* cited by examiner

SCHEDULING SIDELINK COMMUNICATIONS

FIELD OF THE DISCLOSURE

Aspects of the present disclosure generally relate to wireless communication and to techniques and apparatuses for scheduling sidelink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first UE for wireless communication. The first user equipment may include a memory and one or more processors coupled to the memory. The one or more processors may be configured to transmit information indicating a set of resources associated with periodic sidelink monitoring. The one or more processors may be configured to monitor, using at least one resource indicated by the information and during the at least one first period of time, for signals.

Some aspects described herein relate to a first UE for wireless communication. The first UE may include a memory and one or more processors coupled to the memory. The one or more processors may be configured to receive information indicating a set of resources associated with periodic sidelink monitoring. The one or more processors may be configured to transmit, during a particular period of time of the at least one first period of time, and to the second UE, a sidelink wake-up signal (WUS).

Some aspects described herein relate to a method of wireless communication performed by a first UE. The method may include transmitting information indicating a set of resources associated with periodic sidelink monitoring, the information indicating at least one first period of time during which the first UE will remain awake and monitor for signals and at least one second period of time during which the first UE will be in a sleep mode and not monitoring for signals. The method may include monitoring, using at least one resource indicated by the information and during the at least one first period of time, for signals.

Some aspects described herein relate to a method of wireless communication performed by a first UE. The method may include receiving information indicating a set of resources associated with periodic sidelink monitoring, the information indicating at least one first period of time during which a second UE will remain awake and monitor for signals and at least one second period of time during which the second UE will be in a sleep mode and not monitoring for signals. The method may include transmitting, during a particular period of time of the at least one first period of time, and to the second UE, a sidelink WUS.

Some aspects described herein relate to a non-transitory computer-readable medium that stores a set of instructions for wireless communication by a first UE. The set of instructions, when executed by one or more processors of the UE, may cause the UE to transmit information indicating a set of resources associated with periodic sidelink monitoring. The set of instructions, when executed by one or more processors of the UE, may cause the UE to monitor, using at least one resource indicated by the information and during the at least one first period of time, for signals.

Some aspects described herein relate to a non-transitory computer-readable medium that stores a set of instructions for wireless communication by a first UE. The set of instructions, when executed by one or more processors of the first UE, may cause the first UE to receive information indicating a set of resources associated with periodic sidelink monitoring. The set of instructions, when executed by one or more processors of the first UE, may cause the first UE to transmit, during a particular period of time of the at least one first period of time, and to the second UE, a sidelink WUS.

Some aspects described herein relate to an apparatus for wireless communication. The apparatus may include means for transmitting information indicating a set of resources associated with periodic sidelink monitoring, the information indicating at least one first period of time during which a first UE will remain awake and monitor for signals and at least one second period of time during which the first UE will be in a sleep mode and not monitoring for signals. The apparatus may include means for monitoring, using at least one resource indicated by the information and during the at least one first period of time, for signals.

Some aspects described herein relate to an apparatus for wireless communication. The apparatus may include means for receiving information indicating a set of resources associated with periodic sidelink monitoring, the information indicating at least one first period of time during which a second UE will remain awake and monitor for signals and at least one second period of time during which the second UE will be in a sleep mode and not monitoring for signals. The apparatus may include means for transmitting, during a particular period of time of the at least one first period of time, and to the second UE, a sidelink WUS.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antennas, RF-chains, power amplifiers, modulators, buffers, processor(s), interleavers, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
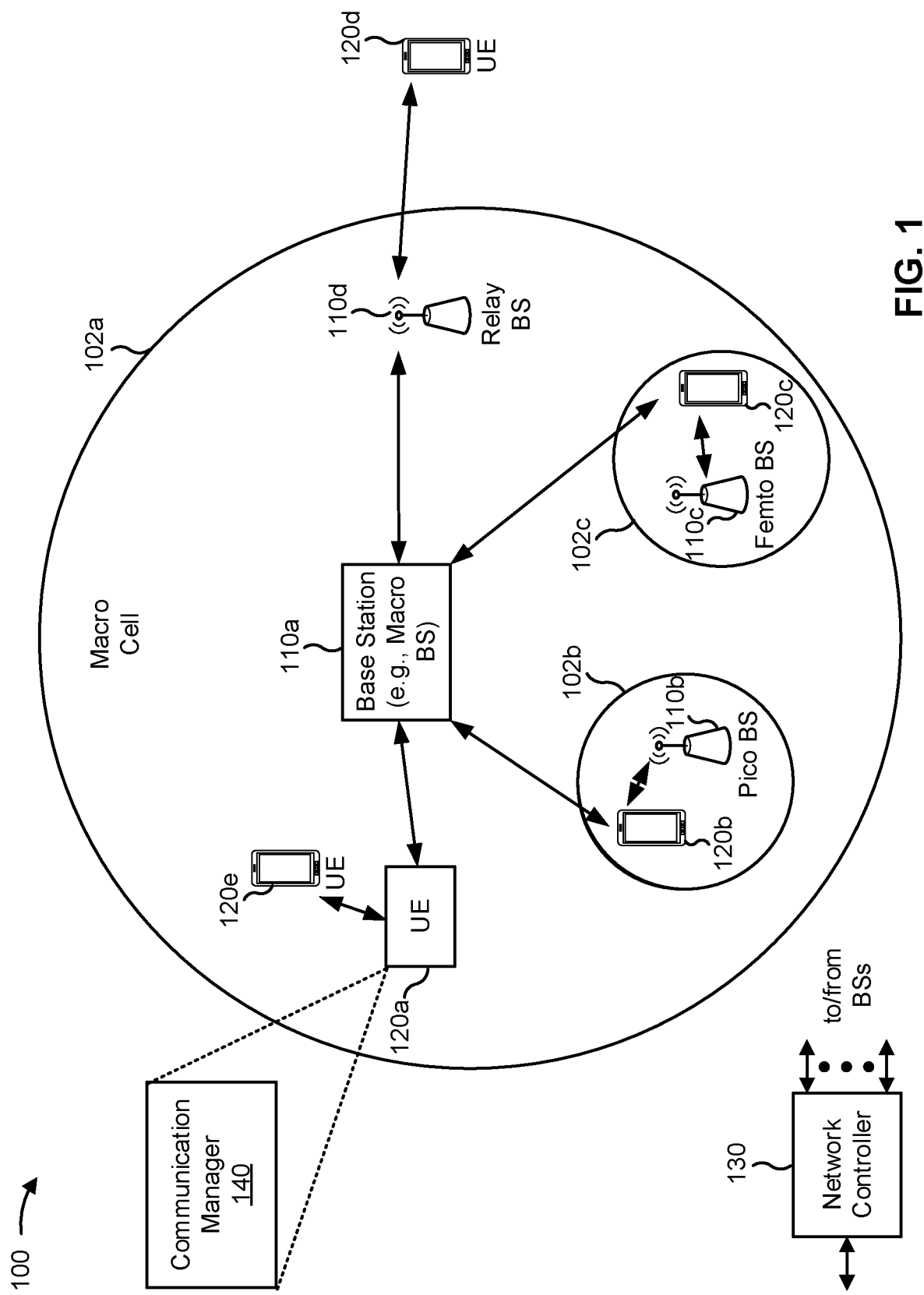
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit information indicating a set of resources associated with periodic sidelink monitoring, the information indicating at least one first period of time during which the first UE will remain awake and monitor for signals and at least one second period of time during which the first UE will be in a sleep mode and not monitoring for signals; and monitor, using at least one resource indicated by the information and during the at least one first period of time, for signals.

As described in more detail elsewhere herein, the communication manager 140 may receive information indicating a set of resources associated with periodic sidelink monitoring, the information indicating at least one first period of time during which a second UE will remain awake and monitor for signals and at least one second period of time during which the second UE will be in a sleep mode and not monitoring for signals; and transmit, during a particular period of time of the at least one first period of time, and to the second UE, a sidelink WUS. Additionally, or alternatively, the communication manager 140 may perform one or more other operations described herein.

As indicated above, FIG. 1 is provided as an example. Other examples may differ from what is described with regard to FIG. 1.

Figure 2:
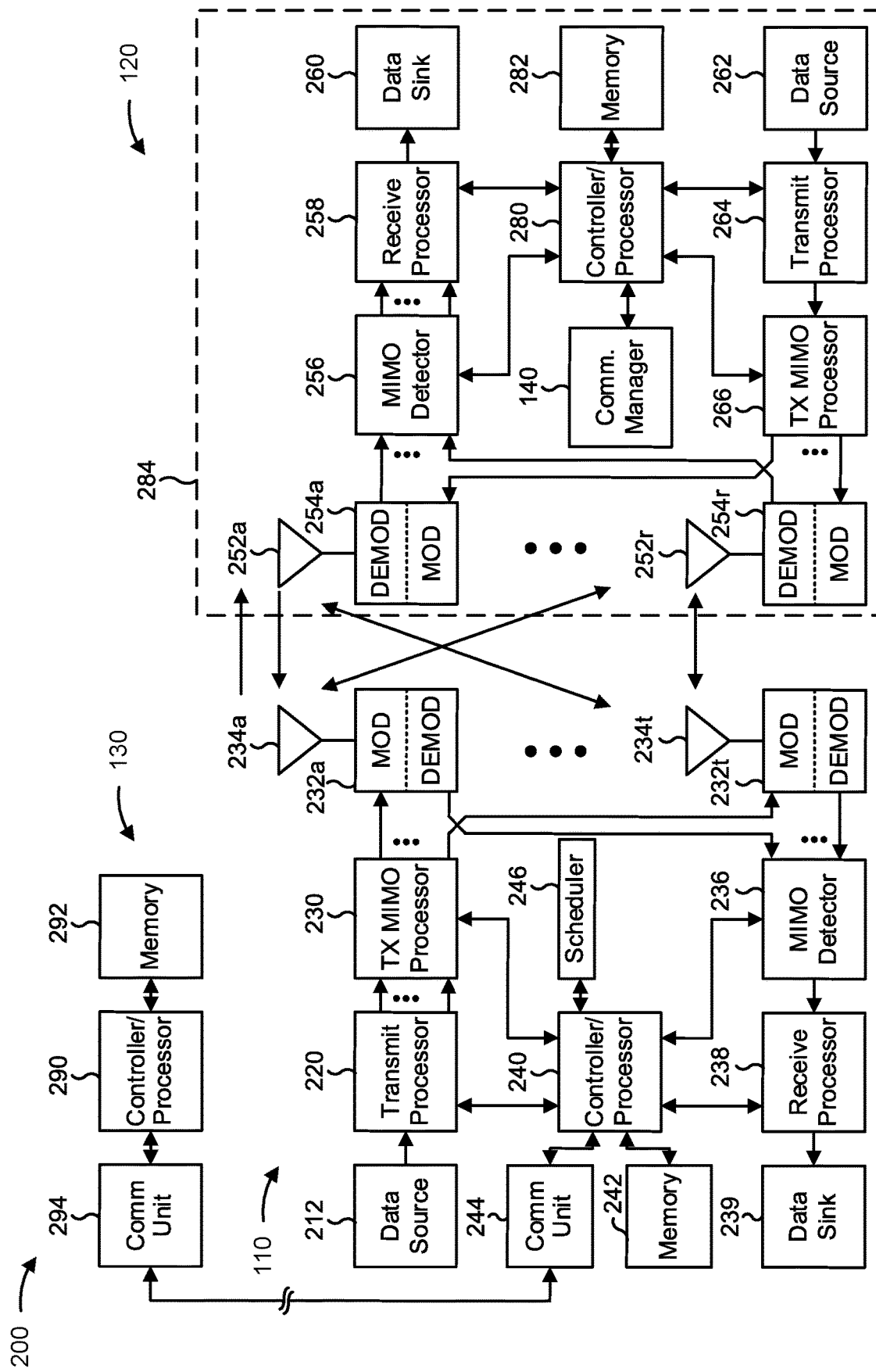
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-8).

The controller/processor 240 of the base station 110, the controller/processor 280 of the UE 120, and/or any other component(s) of FIG. 2 may perform one or more techniques associated with scheduling sidelink communications, as described in more detail elsewhere herein. For example, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the first UE includes means for transmitting information indicating a set of resources associated with periodic sidelink monitoring, the information indicating at least one first period of time during which the first UE will remain awake and monitor for signals and at least one second period of time during which the first UE will be in a sleep mode and not monitoring for signals; and/or means for monitoring, using at least one resource indicated by the information and during the at least one first period of time, for signals. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the first UE includes means for receiving information indicating a set of resources associated with periodic sidelink monitoring, the information indicating at least one first period of time during which a second UE will remain awake and monitor for signals and at least one second period of time during which the second UE will be in a sleep mode and not monitoring for signals; and/or means for transmitting, during a particular period of time of the at least one first period of time, and to the second UE, a sidelink WUS. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
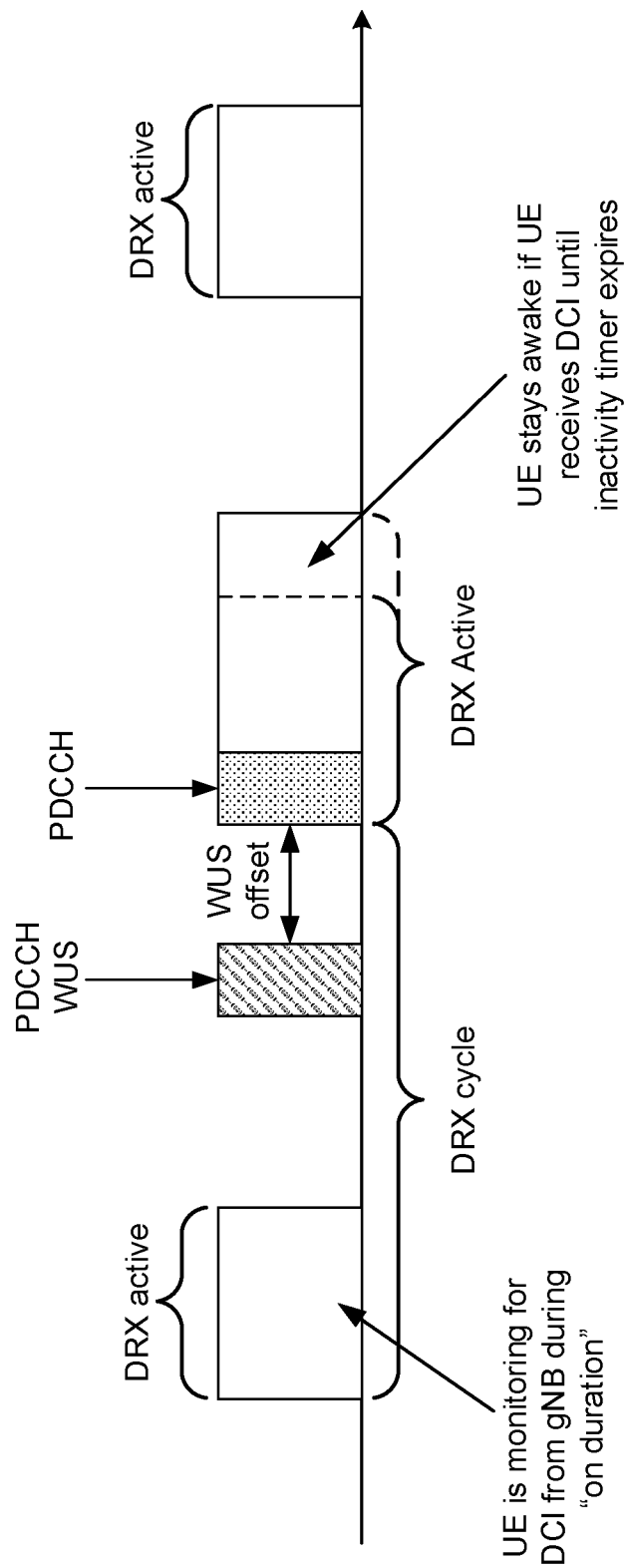
FIG. 3 is a diagram illustrating an example of discontinuous reception (DRX), in accordance with the present disclosure.

FIG. 3 is a diagram illustrating an example 300 of discontinuous reception (DRX), in accordance with the present disclosure.

As shown in FIG. 3, a UE may be configured to perform DRX in a manner designed to conserve battery life of the UE. For example, the UE may transition to a DRX inactive state (e.g., a sleep mode or off duration) for a DRX inactive duration. While in the DRX inactive state, the UE may refrain from transmitting or receiving on a link between the UE and another device (e.g., a base station, a sidelink UE, and/or the like), may deactivate particular subcarriers or component carriers (e.g., if carrier aggregation is implemented on the access link) of the link, may deactivate one or more components of the UE, and/or the like. Moreover, DRX operation may include periodically transitioning out of the DRX inactive state and into a DRX active state (e.g., an awake mode or on duration) for a DRX active duration to monitor for downlink communications from a BS or sidelink communications from another UE. In some cases, the BS may transmit an instruction to the UE to configure DRX, to cause the UE to perform DRX in accordance with DRX parameters, to transition to a DRX inactive state, and/or the like.

As shown in example 300, when performing DRX, the UE may repeat DRX cycles. Each DRX cycle includes an active portion and an inactive portion. For the inactive portion of the DRX cycle, the UE may be in the DRX inactive state (e.g., conserving battery life), and for the active portion of the DRX cycle, the UE may be in the DRX active state (e.g., monitoring for communications). In some cases, the UE may be configured to use a WUS, such as a physical downlink communication channel (PDCCH) WUS or a sidelink WUS associated with a sidelink channel, to determine whether, for a given DRX cycle, the UE should switch from the DRX inactive state to the DRX active state. For example, a BS or another UE may transmit a WUS to the UE to provide an indication that the UE should switch to the DRX active mode (e.g., for reception of one or more other signals, such as PDCCH, during the DRX active mode). In some cases, if the UE is configured to use a WUS, and a WUS is not received during the DRX inactive state, the UE may not switch to a DRX active state. In this situation, the UE may only switch from the DRX inactive state to the DRX active state based at least in part on receiving a WUS during the DRX inactive state. When a control signal is received during DRX active state, the UE may extend the DRX active duration (e.g., until an inactivity timer expires) to extend the window during which the UE may receive additional control signals. Using the WUS to trigger switching to the DRX active state may enable the UE to further conserve battery life by avoiding unnecessarily switching to the DRX active state.

As noted above, in some cases, a UE may be configured to communicate with another UE over a sidelink, which may be referred to as sidelink communication. In some cases, sidelink communication between UEs might not be scheduled by a BS and may occur at any time. For example, one or more of the UEs may be operating outside of a coverage area of a serving BS or may not be communicatively connected with a serving BS, in which case the one or more UEs may autonomously (or semi-autonomously) schedule the transmission of sidelink communications on the sidelink. Autonomous or semi-autonomous scheduling of sidelink communications may be referred to as Mode 2 sidelink operation, and can be contrasted with Mode 1 sidelink operation, in which a central scheduler (such as a base station) handles scheduling of sidelink communications. In the case of Mode 2 sidelink operation, the BS may be unable to configure DRX operation for a UE, may be unable to instruct the UE to operate in a particular DRX state, and/or the like. However, another UE may be able to configure DRX operation for the UE, provide instructions for the UE to operate in a particular DRX state, and/or the like, via sidelink communication.

As indicated above, FIG. 3 is provided as an example. Other examples may differ from what is described with respect to FIG. 3.

Figure 4:
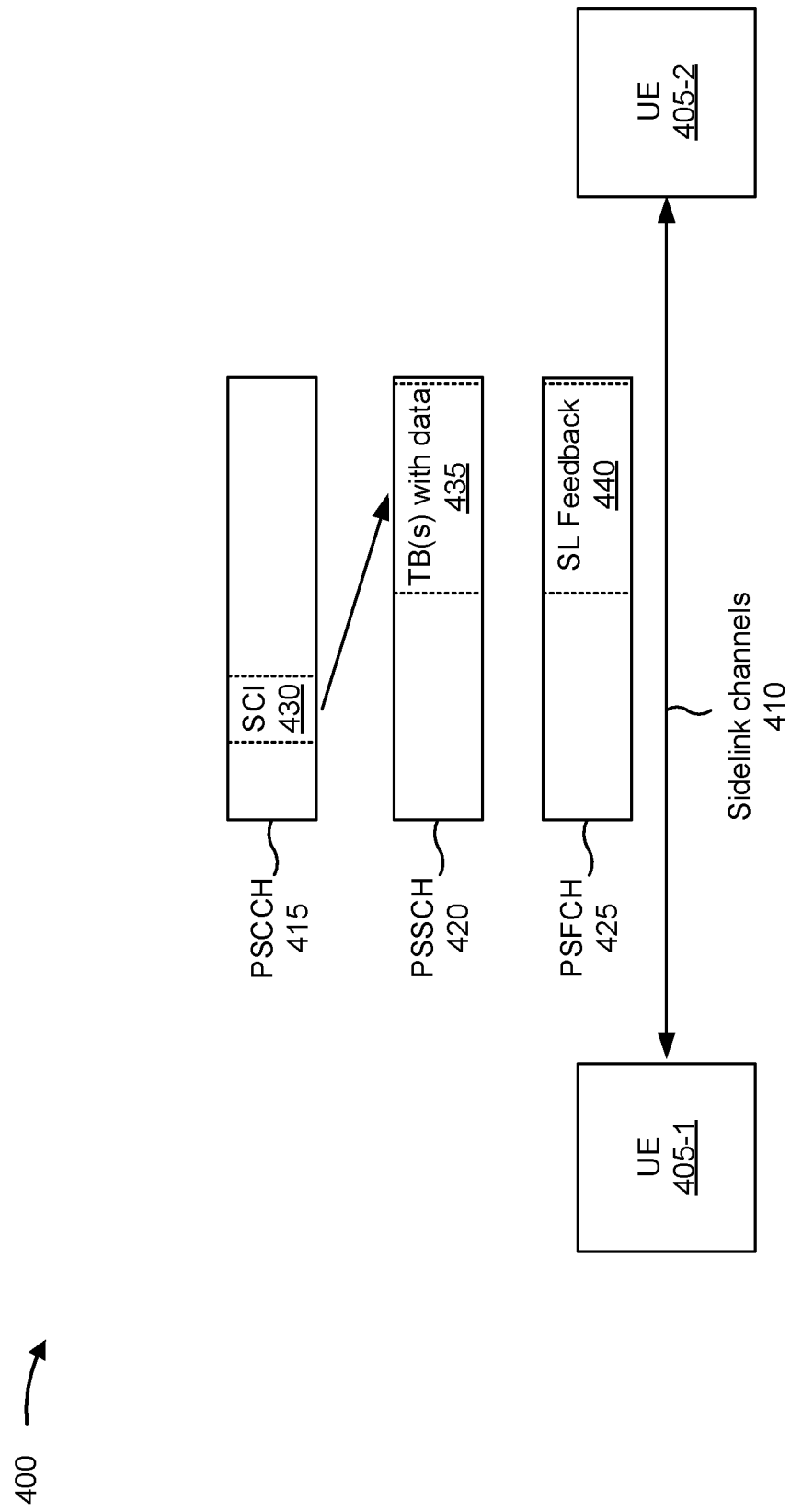
FIG. 4 is a diagram illustrating an example of sidelink communications, in accordance with the present disclosure.

FIG. 4 is a diagram illustrating an example 400 of sidelink communications, in accordance with the present disclosure. As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, V2P communications, and/or the like), mesh networking, and/or the like. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, symbols, and/or the like) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a PDCCH and/or a physical uplink control channel (PUCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430, which may indicate various control information used for sidelink communications, such as one or more resources (e.g., time resources, frequency resources, spatial resources, and/or the like) where a transport block (TB) 435 may be carried on the PSSCH 420. The TB 435 may include data. The PSFCH 425 may be used to communicate sidelink feedback 440, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 410 may use resource pools. A resource pool is a configuration indication a group of resources that can be used for sidelink communication. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a transmission mode where resource selection and/or scheduling is performed by the UE 405 (e.g., rather than a central scheduler such as a base station 110). In some aspects, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or the like, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources, channel parameters, and/or the like. Additionally, or alternatively, the UE 405 may perform resource selection and/or scheduling by determining a channel busy rate (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more slots to be used for the upcoming sidelink transmission, an MCS to be used for the upcoming sidelink transmission, and/or the like. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

As noted above, DRX may conserve UE battery resources by limiting communication resources used while performing DRX operations. For example, DRX between a base station and UE may enable the UE to sleep and conserve resources as the base station may communicate with the UE during DRX active durations and conserve power otherwise. Sidelink DRX could be used for sidelink communications between UEs, e.g., by configuring sidelink DRX in both directions (e.g., from a first UE to a second UE, and from a second UE to a first UE); however, DRX configured via a base station for multiple UEs requires coordination and resources of the base station and may not enable a UE to set its own schedule for conserving resources. In addition, scheduling conflicts may occur between UEs configured for DRX in situations where DRX active time periods overlap (e.g., due to configuration, extension of DRX active durations, and/or the like). The scheduling conflicts may result in lower quality sidelink communications, dropped sidelink communications, high resource collision, interference, inefficient use of resources, higher latency, lower throughput, and/or the like.

Some aspects described herein provide techniques and apparatuses for scheduling sidelink communications. In some aspects, a first UE may transmit information indicating resources associated with periodic sidelink monitoring (e.g., an alternating schedule of time periods during which the first UE will be sleeping or monitoring for sidelink communications). A second UE may use the information to schedule and transmit sidelink communications, and the first UE may receive the sidelink communications while monitoring for signals. Based at least in part on receiving the sidelink communications, the first UE may extend its time period for being awake to enable sidelink communications between the first UE and second UE to occur.

As a result, UEs are able to conserve battery and communication resources without relying on DRX. While one UE may schedule alternating sleep and awake modes, and other UEs may use information indicating the schedule to determine when the other UEs may interrupt their own sleep mode to transmit to the UE. This enables both transmitting and receiving UEs to conserve battery and communication resources and may assist in avoiding scheduling conflicts that could lead to various issues described herein, such as resource collision, scheduling conflicts, dropped communications, interference, hither latency, lower throughput, among other examples. Thus, in addition to improved battery and communication resource usage, sidelink communication quality and throughput may be improved, as well as the reliability and latency of sidelink communications.

Figure 5:
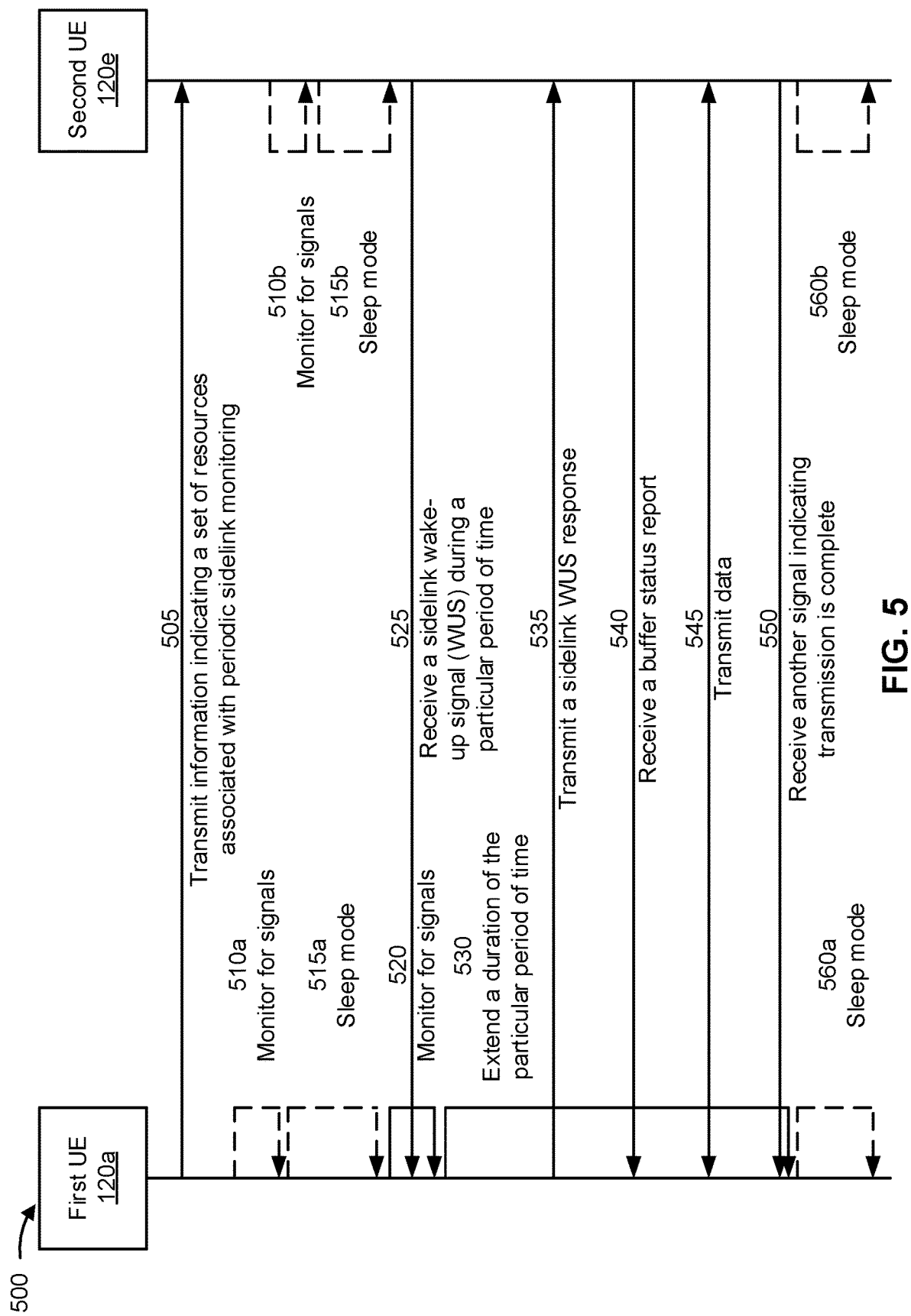
FIG. 5 is a diagram illustrating an example associated with scheduling sidelink communications, in accordance with the present disclosure.

FIG. 5 is a diagram illustrating an example 500 associated with scheduling sidelink communications, in accordance with the present disclosure. As shown in FIG. 5, a first UE 120 and a second UE 120 may communicate with one another.

As shown by reference number 505, the first UE may transmit, and the second UE may receive, information indicating a set of resources associated with periodic sidelink monitoring. The information may indicate at least one first period of time during which the first UE will remain awake (e.g., in an "awake mode") and monitor for signals and at least one second period of time during which the first UE will be in a sleep mode and not monitoring for signals. For example, the information may indicate a monitoring schedule for the first UE, which may enable other UEs, such as the second UE, to schedule communications with the first UE during the periods of time the first UE is monitoring for signals (e.g., the at least one first time period of time).

The information may be transmitted and/or received in a variety of ways. For example, the first UE may transmit the information directly to the second UE via PSCCH or PSSCH, among other examples. As another example, the first UE may broadcast the information, and the second UE may receive the information, by monitoring for broadcast signals.

In some aspects, the set of resources may refer to one or more of time resources, frequency resources, and/or spatial resources (e.g., beams), among other examples, for wireless communications. For example, in some aspects, the set of resources is associated with a particular receive beam of the first UE. In some aspects, the set of resources is one of multiple different sets of periodic resources. For example, in some situations, the sets of periodic resources may repeat in a cyclic manner such that the difference between sets of period resources is time. In some situations, the sets of periodic resources may change over time, such that different sets of periodic resources may be associated with different times, frequencies, beams, and/or the like.

In some aspects, the first UE may select the set of resources based on configuration information of the first UE. For example, the set of resources may be selected based at least in part on UE configuration information and/or based at least in part on configuration information received by the first UE (e.g., from a base station).

As shown by reference numbers 510a, 515a and 520, the first UE may alternate between the sleep mode and the awake mode based at least in part on the set of resources. In some aspects, when monitoring for signals, the first UE may monitor for signals using at least one resource indicated by the information and during the at least one first periods of time. For example, reference number 510a may correspond to one of the at least one first periods of time, and reference number 515a may correspond to one of the at least one second periods of time. By alternating between sleep modes and awake modes, the UE may conserve resources, as described herein.

In some aspects, as shown by reference number 510b and 515b, the second UE may also alternate between a sleep mode and an awake mode for the second UE. For example, the second UE may be associated with separate sidelink monitoring information and a separate schedule for alternating between sleep modes and awake modes.

As shown by reference number 525, the second UE may transmit, and the first UE may receive, during a particular period of time of the at least one first periods of time, a sidelink WUS. For example, the second UE may transmit the sidelink WUS during a period of time associated with the awake mode of the first UE. Based on the information received by the second UE, the second UE is capable of selecting a time to transmit data to the first UE that corresponds to the first UE's awake mode.

As shown by reference number 530, the first UE may extend a duration of the particular period of time based at least in part on receiving the sidelink WUS. For example, the particular period of time may correspond to an awake mode of the first UE, which may be extended based at least in part on receiving the sidelink WUS. The duration may be extended by a pre-configured amount of time or extended by an amount of time indicated by the sidelink WUS.

In some aspects, the sidelink WUS indicates an identifier of the first UE. For example, the sidelink WUS may include data identifying the first UE to enable the first UE to determine that the sidelink WUS is intended for the first UE. In some aspects, the sidelink WUS indicates a threshold period of time for the first UE to provide a sidelink WUS response. For example, the second UE may include the threshold period of time in a manner designed to prevent the second UE from remaining awake for an extended period of time and enabling the second UE to return to the sleep mode.

In this situation, the second UE may attempt to communicate with the first UE again, or the second UE may wait for the first UE to communicate with the second UE (e.g., based at least in part on a sidelink monitoring schedule of the second UE).

As shown by reference number 535, the first UE may transmit, and the second UE may receive, a sidelink WUS response indicating that the first UE is ready to receive data from the second UE. The sidelink WUS response may provide the second UE with confirmation that the first UE received the sidelink WUS and, in some situations, may indicate that the first UE is ready to receive data from the second UE. In some aspects, the sidelink WUS response may indicate future resources that should be used for sidelink communications between the first UE and the second UE. For example, the first UE may not be immediately available to receive data from the second UE, and the sidelink WUS response may identify a later time for communications between the first UE and the second UE.

In some aspects, the sidelink WUS response may further indicate one or more resources that are unavailable for receiving transmissions from the second UE. For example, the sidelink WUS response may indicate that one or more time resources, frequency resources, and/or spatial resources, may be unavailable for sidelink communications. In some aspects, the sidelink WUS response may further indicate one or more resources that are available for receiving transmissions from the second UE. For example, the sidelink WUS response may indicate that one or more time resources, frequency resources, and/or spatial resources, are available for sidelink communications.

In some aspects, the sidelink WUS response indicates that the first UE has data to be transmitted to the second UE. In this situation, the second UE is notified, via the sidelink WUS response that the first UE has data to transmit to the second UE.

As shown by reference number 540, the second UE may transmit, and the first UE may receive, a buffer status report (BSR) indicating an amount of data to be transmitted from the second UE to the first UE. The BSR may be used to allocate resources for the sidelink communications between the first UE and the second UE. For example, the BSR may be used by the first UE to determine how long the awake mode should be extended.

In some aspects, the first UE may determine, based at least in part on the BSR, a sleep time associated with the first UE activating the sleep mode. In this situation, the first UE may activate the sleep mode based at least in part on the sleep time. In some aspects, the first UE may transmit a BSR to the second UE, e.g., in a situation where the first UE has data to transmit to the second UE.

As shown by reference number 545, the second UE may transmit data, and the first UE may receive the data. In some aspects, the first UE may transmit data, and the second UE may receive the data. The transmission of data via sidelink communications may be carried out as described herein (e.g., via PSSCH and PSFCH, among other examples). In some aspects, the amount of data transmitted may correspond to the amount of data identified in the BSR.

As shown by reference number 550, the second UE may transmit, and the first UE may receive, another signal indicating that transmission of the data from the second UE to the first UE is complete. For example, after the second UE has finished transmitting data to the first UE, the second UE may use the other signal to enable the first UE to determine that the second UE has finished transmitting the data.

As shown by reference numbers 560*a* and 560*b*, the first UE and/or the second UE may activate a corresponding sleep mode based at least in part on receipt and/or transmission of the other signal. For example, the first UE and/or the second UE may return to respective sidelink communication schedules, e.g., alternating between sleep mode and awake mode in a manner designed to conserve resources.

As indicated above, FIG. 5 is provided as an example. Other examples may differ from what is described with respect to FIG. 5.

Figure 6:
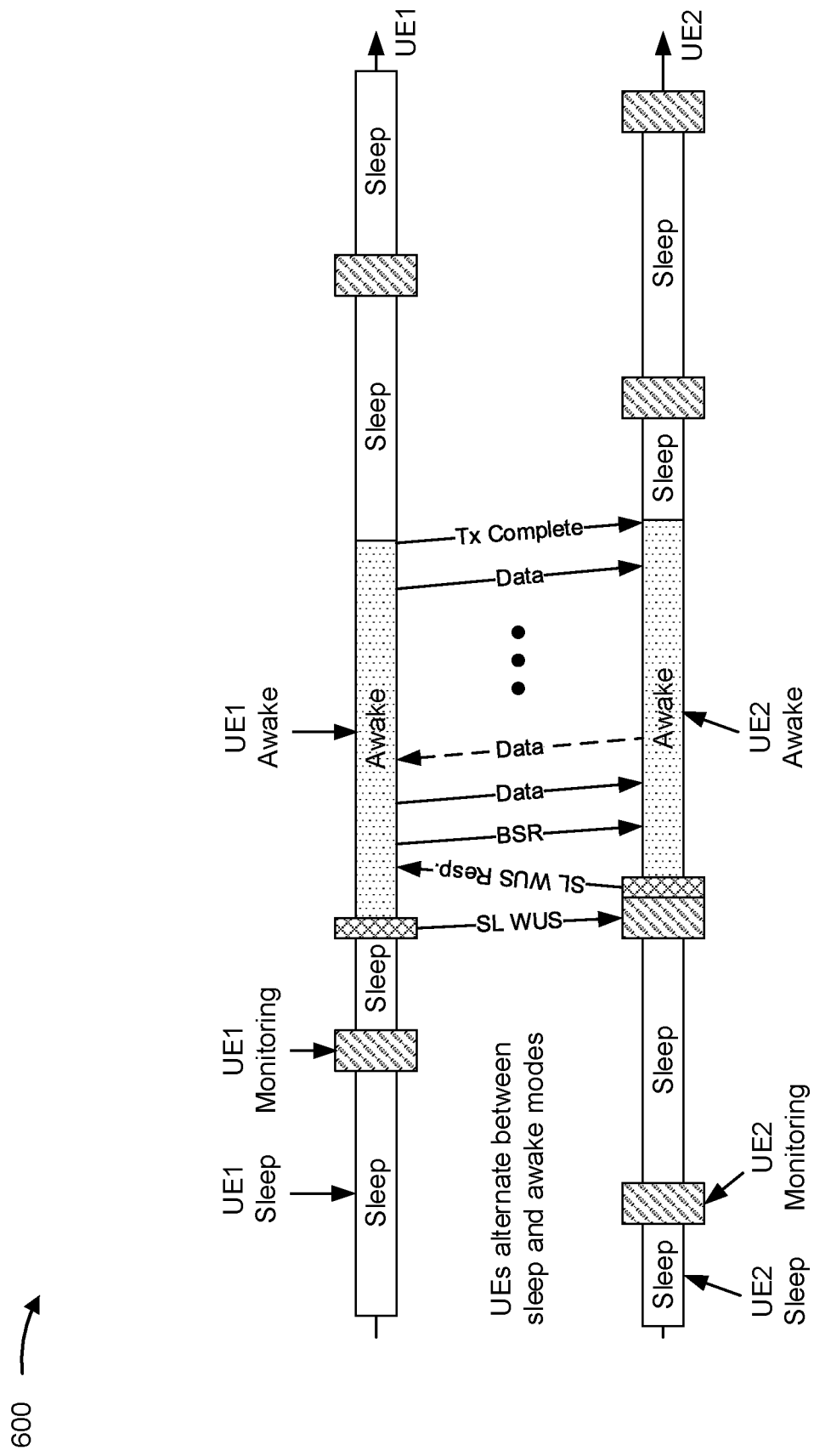
FIG. 6 is a diagram illustrating an example associated with sidelink communications, in accordance with the present disclosure.

FIG. 6 is a diagram illustrating an example 600 of sidelink communications, in accordance with the present disclosure. As shown in FIG. 6, UE1 (e.g., a UE 120) and UE2 (e.g., another UE 120) may communicate with one another.

As shown by example 600, UE1 and UE2 may each be alternating between corresponding sleep modes and awake modes. In this example 600, UE1 is aware of UE2's monitoring schedule (e.g., based at least in part on prior communication with UE2), and UE1 has data to be transmitted to UE2.

In this example 600, UE1 wakes up from sleep mode to transmit a sidelink WUS at a time UE1 expects UE2 to be awake and monitoring for signals. When UE2 receives the sidelink WUS, UE2 transmits a sidelink WUS response to UE1 to indicate that UE2 received the sidelink WUS. UE2 also stays in the awake mode to continue to receive communications from UE1.

After receiving the sidelink WUS response, UE1 transmits a BSR to UE2 to indicate an amount of data UE1 has to transmit to UE2. UE1 then begins transmitting data to UE2. Optionally, as shown in example 600, UE2 may also transmit data to UE1 during the period of time in which both UEs are awake and in communication with one another.

When UE1 is finished transmitting data to UE2, UE1 transmits another signal (e.g., a "transmission complete" signal, or "Tx complete" signal) to UE2 to indicate that UE1 is finished with transmitting data to UE2. Based at least in part on sending the Tx complete signal, UE1 returns to periodic sidelink monitoring, alternating between sleep mode and awake mode. Based at least in part on receiving the Tx complete signal, UE2 also returns to periodic sidelink monitoring. While, in this example 600, both UEs revert to periodic sidelink monitoring after the sidelink data transmission is complete, the UEs may take other actions, including remaining awake, communicating with another UE, and/or adjusting a periodic sidelink monitoring schedule, among other examples.

As indicated above, FIG. 6 is provided as an example. Other examples may differ from what is described with respect to FIG. 6.

Some aspects described herein provide techniques and apparatuses for scheduling sidelink communications. In some aspects, a first UE may transmit information indicating resources associated with periodic sidelink monitoring (e.g., an alternating schedule of time periods during which the first UE will be sleeping or monitoring for sidelink communications). A second UE may use the information to schedule and transmit sidelink communications, and the first UE may receive the sidelink communications while monitoring for signals. Based at least in part on receiving the sidelink communications, the first UE may extend its time period for being awake to enable sidelink communications between the first UE and second UE to occur.

As a result, UEs are able to conserve battery and communication resources without relying on DRX. While one UE may schedule alternating sleep and awake modes, and other UEs may use information indicating the schedule to determine when the other UEs may interrupt their own sleep mode to transmit to the UE. This enables both transmitting and receiving UEs to conserve battery and communications resources and may assist in avoiding scheduling conflicts that could lead to various issues described herein, such as resource collision, scheduling conflicts, dropped communications, interference, hither latency, lower throughput, among other examples. Thus, in addition to improved battery and communication resource usage, sidelink communication quality and throughput may be improved, as well as the reliability and latency of sidelink communications.

Figure 7:
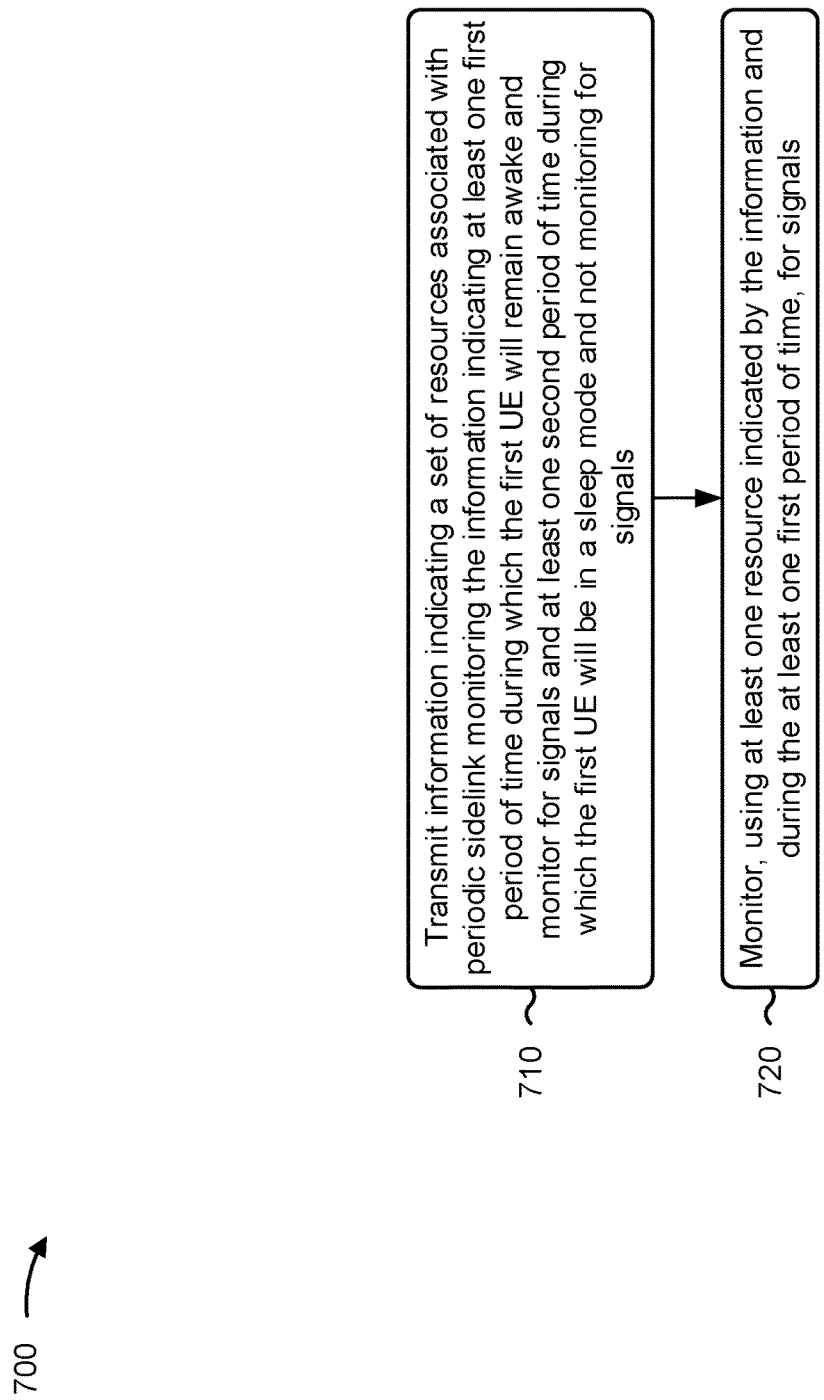
FIGS. 7 and 8 are diagrams illustrating example processes associated with scheduling sidelink communications, in accordance with the present disclosure.

FIG. 7 is a diagram illustrating an example process 700 performed, for example, by a first UE, in accordance with the present disclosure. Example process 700 is an example where the first UE (e.g., UE 120) performs operations associated with scheduling sidelink communications.

As shown in FIG. 7, in some aspects, process 700 may include transmitting information indicating a set of resources associated with periodic sidelink monitoring, the information indicating at least one first period of time during which the first UE will remain awake and monitor for signals and at least one second period of time during which the first UE will be in a sleep mode and not monitoring for signals (block 710). For example, the first UE (e.g., using communication manager 140 and/or transmission component 904, depicted in FIG. 9) may transmit information indicating a set of resources associated with periodic sidelink monitoring, the information indicating at least one first period of time during which the first UE will remain awake and monitor for signals and at least one second period of time during which the first UE will be in a sleep mode and not monitoring for signals, as described above.

As further shown in FIG. 7, in some aspects, process 700 may include monitoring, using at least one resource indicated by the information and during the at least one first period of time, for signals (block 720). For example, the first UE (e.g., using communication manager 140 and/or monitoring component 908, depicted in FIG. 9) may monitor, using at least one resource indicated by the information and during the at least one first period of time, for signals, as described above.

Process 700 may include additional aspects, such as any single aspect or any combination of aspects described below and/or in connection with one or more other processes described elsewhere herein.

In a first aspect, process 700 includes receiving, during a particular period of time of the at least one first period of time, and from a second UE, a sidelink WUS, and extending a duration of the particular period of time based at least in part on receiving the sidelink WUS.

In a second aspect, alone or in combination with the first aspect, the sidelink WUS indicates an identifier of the first UE.

In a third aspect, alone or in combination with one or more of the first and second aspects, the sidelink WUS indicates a threshold period time for the first UE to provide a sidelink WUS response.

In a fourth aspect, alone or in combination with one or more of the first through third aspects, process 700 includes transmitting, to the second UE, a sidelink WUS response indicating that the first UE is ready to receive data from the second UE.

In a fifth aspect, alone or in combination with one or more of the first through fourth aspects, the sidelink WUS response further indicates one or more resources that are unavailable for receiving transmissions from the second UE.

In a sixth aspect, alone or in combination with one or more of the first through fifth aspects, the sidelink WUS response further indicates one or more resources that are available for receiving transmissions from the second UE.

In a seventh aspect, alone or in combination with one or more of the first through sixth aspects, the sidelink WUS response indicates that the first UE has data to be transmitted to the second UE.

In an eighth aspect, alone or in combination with one or more of the first through seventh aspects, process 700 includes receiving, from a second UE, a buffer status report indicating an amount of data to be transmitted from the second UE to the first UE.

In a ninth aspect, alone or in combination with one or more of the first through eighth aspects, process 700 includes determining, based at least in part on the buffer status report, a sleep time associated with the first UE activating the sleep mode, and activating the sleep mode based at least in part on the sleep time.

In a tenth aspect, alone or in combination with one or more of the first through ninth aspects, process 700 includes receiving, from a second UE, another signal indicating transmission of data from the second UE to the first UE is complete, and activating the sleep mode based at least in part on the other signal.

In an eleventh aspect, alone or in combination with one or more of the first through tenth aspects, the set of resources is one of a plurality of different sets of periodic resources.

In a twelfth aspect, alone or in combination with one or more of the first through eleventh aspects, the set of resources is associated with a particular receive beam of the first UE.

In a thirteenth aspect, alone or in combination with one or more of the first through twelfth aspects, process 700 includes alternating between the sleep mode and an awake mode based at least in part on the set of resources.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
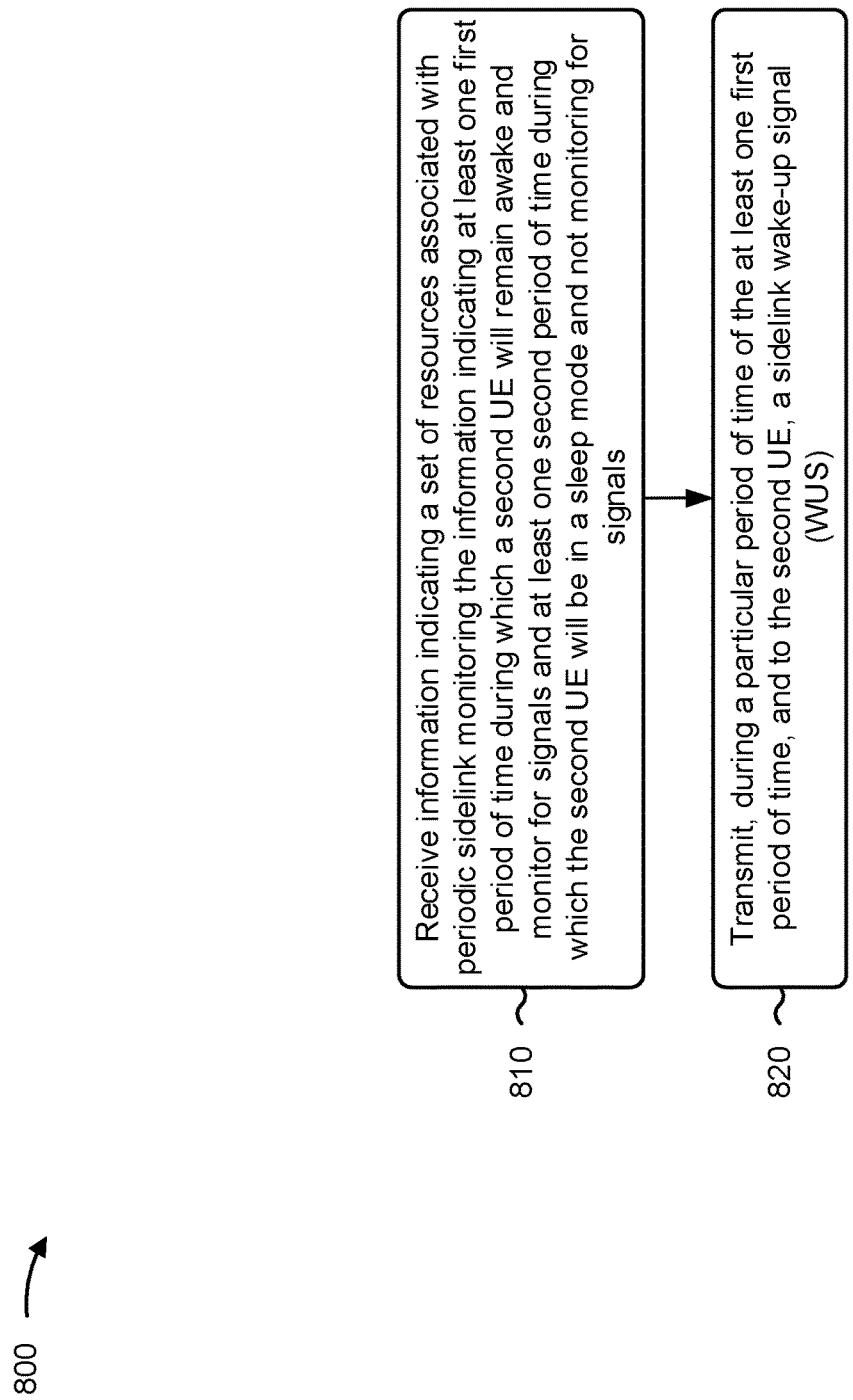

FIG. 8 is a diagram illustrating an example process 800 performed, for example, by a first UE, in accordance with the present disclosure. Example process 800 is an example where the first UE (e.g., UE 120) performs operations associated with scheduling sidelink communications.

As shown in FIG. 8, in some aspects, process 800 may include receiving information indicating a set of resources associated with periodic sidelink monitoring, the information indicating at least one first period of time during which a second UE will remain awake and monitor for signals and at least one second period of time during which the second UE will be in a sleep mode and not monitoring for signals (block 810). For example, the first UE (e.g., using communication manager 140 and/or reception component 1002, depicted in FIG. 10) may receive information indicating a set of resources associated with periodic sidelink monitoring, the information indicating at least one first period of time during which a second UE will remain awake and monitor for signals and at least one second period of time during which the second UE will be in a sleep mode and not monitoring for signals, as described above.

As further shown in FIG. 8, in some aspects, process 800 may include transmitting, during a particular period of time of the at least one first period of time, and to the second UE, a sidelink WUS (block 820). For example, the first UE (e.g., using communication manager 140 and/or transmission component 1004, depicted in FIG. 10) may transmit, during a particular period of time of the at least one first period of time, and to the second UE, a sidelink WUS, as described above.

Process 800 may include additional aspects, such as any single aspect or any combination of aspects described below and/or in connection with one or more other processes described elsewhere herein.

In a first aspect, the sidelink WUS indicates an identifier of the second UE.

In a second aspect, alone or in combination with the first aspect, process 800 includes receiving, from the second UE, a sidelink WUS response indicating that the second UE is ready to receive data from the first UE.

In a third aspect, alone or in combination with one or more of the first and second aspects, process 800 includes transmitting, to the second UE and based at least in part on receiving the sidelink WUS response, data.

In a fourth aspect, alone or in combination with one or more of the first through third aspects, the sidelink WUS response further indicates one or more resources that are unavailable for receiving transmissions from the first UE.

In a fifth aspect, alone or in combination with one or more of the first through fourth aspects, the sidelink WUS response further indicates one or more resources that are available for receiving transmissions from the first UE.

In a sixth aspect, alone or in combination with one or more of the first through fifth aspects, the sidelink WUS response indicates that the second UE has data to be transmitted to the first UE.

In a seventh aspect, alone or in combination with one or more of the first through sixth aspects, the sidelink WUS indicates a threshold period time for the second UE to provide a sidelink WUS response.

In an eighth aspect, alone or in combination with one or more of the first through seventh aspects, process 800 includes transmitting, to the second UE, a buffer status report indicating an amount of data to be transmitted from the first UE to the second UE.

In a ninth aspect, alone or in combination with one or more of the first through eighth aspects, process 800 includes transmitting, to the second UE, another signal indicating transmission of data from the first UE to the second UE is complete, and activating a second sleep mode of the first UE based at least in part on transmitting the other signal.

In a tenth aspect, alone or in combination with one or more of the first through ninth aspects, the set of resources is one of a plurality of different sets of periodic resources.

In an eleventh aspect, alone or in combination with one or more of the first through tenth aspects, the set of resources is associated with a particular receive beam of the second UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
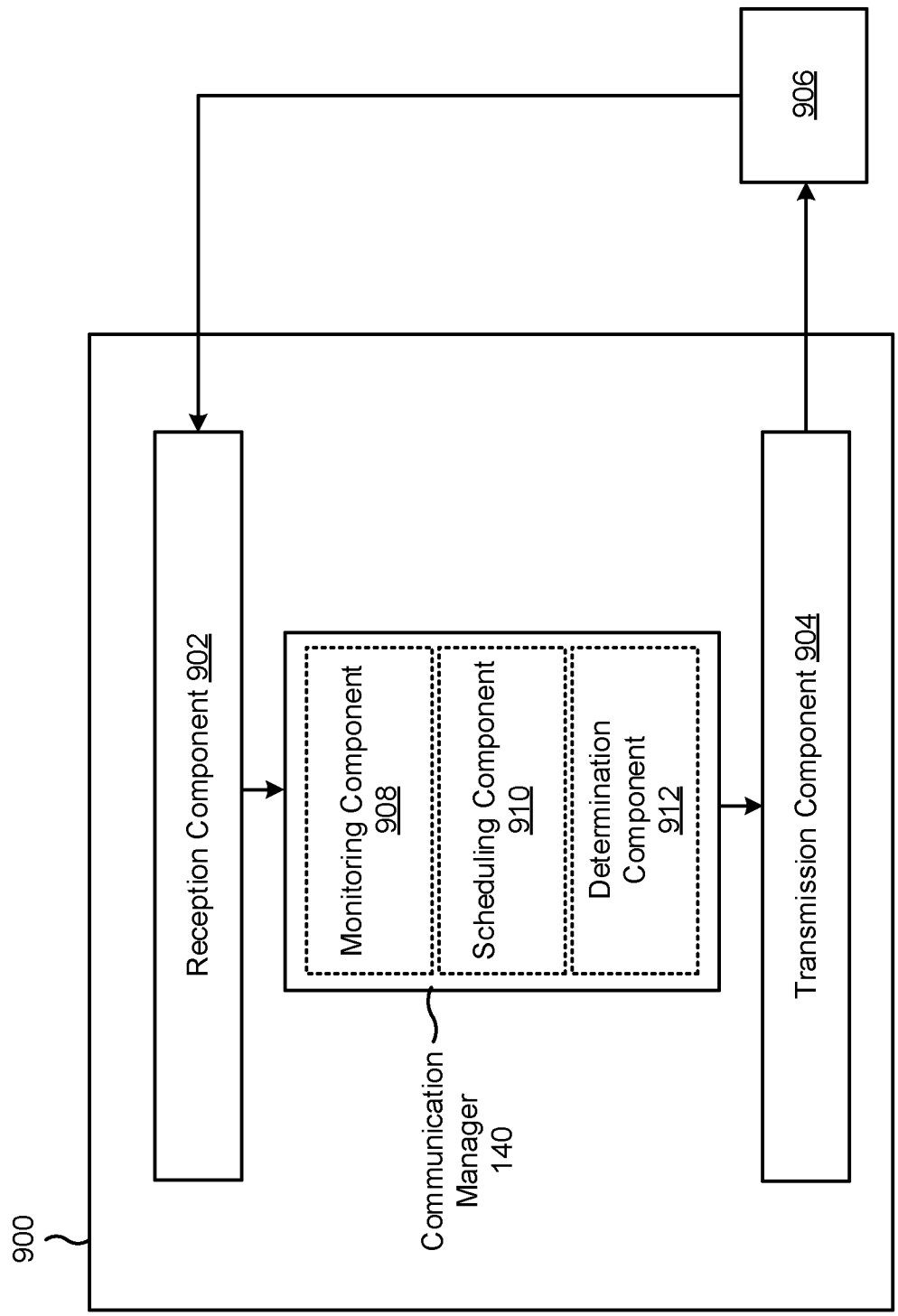
FIGS. 9 and 10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a monitoring component 908, a scheduling component 910, or a determination component 912, among other examples.

In some aspects, the apparatus 900 may be configured to perform one or more operations described herein in connection with FIGS. 5-8. Additionally, or alternatively, the apparatus 900 may be configured to perform one or more processes described herein, such as process 700 of FIG. 7, process 800 of FIG. 8, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The transmission component 904 may transmit information indicating a set of resources associated with periodic sidelink monitoring the information indicating at least one first period of time during which the first UE will remain awake and monitor for signals and at least one second period of time during which the first UE will be in a sleep mode and not monitoring for signals. The monitoring component 908 may monitor, using at least one resource indicated by the information and during the at least one first period of time, for signals.

The reception component 902 may receive, during a particular period of time of the at least one first period of time, and from a second UE, a sidelink WUS.

The scheduling component 910 may extend a duration of the particular period of time based at least in part on receiving the sidelink WUS.

The transmission component 904 may transmit, to the second UE, a sidelink WUS response indicating that the first UE is ready to receive data from the second UE.

The reception component 902 may receive, from a second UE, a buffer status report indicating an amount of data to be transmitted from the second UE to the first UE.

The determination component 912 may determine, based at least in part on the buffer status report, a sleep time associated with the first UE activating the sleep mode.

The scheduling component 910 may activate the sleep mode based at least in part on the sleep time.

The reception component 902 may receive, from a second UE, another signal indicating transmission of data from the second UE to the first UE is complete.

The scheduling component 910 may activate the sleep mode based at least in part on the other signal.

The scheduling component 910 may alternate between the sleep mode and an awake mode based at least in part on the set of resources.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
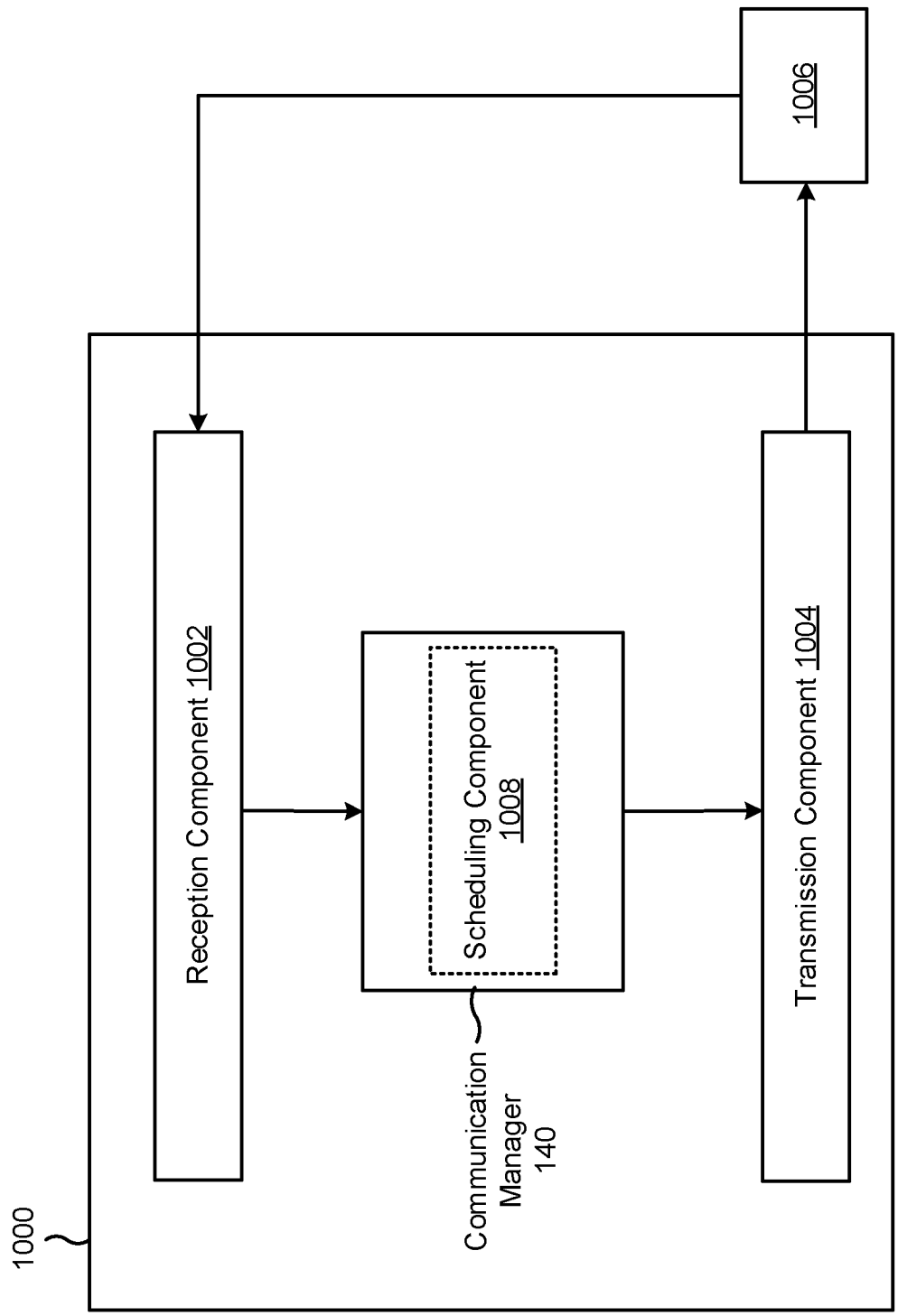

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a scheduling component 1008, among other examples.

In some aspects, the apparatus 1000 may be configured to perform one or more operations described herein in connection with FIGS. 5-8. Additionally, or alternatively, the apparatus 1000 may be configured to perform one or more processes described herein, such as process 700 of FIG. 7, process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The reception component 1002 may receive information indicating a set of resources associated with periodic sidelink monitoring the information indicating at least one first period of time during which a second UE will remain awake and monitor for signals and at least one second period of time during which the second UE will be in a sleep mode and not monitoring for signals. The transmission component 1004 may transmit, during a particular period of time of the at least one first period of time, and to the second UE, a sidelink WUS.

The reception component 1002 may receive, from the second UE, a sidelink WUS response indicating that the second UE is ready to receive data from the first UE.

The transmission component 1004 may transmit, to the second UE and based at least in part on receiving the sidelink WUS response, data.

The transmission component 1004 may transmit, to the second UE, a buffer status report indicating an amount of data to be transmitted from the first UE to the second UE.

The transmission component 1004 may transmit, to the second UE, another signal indicating transmission of data from the first UE to the second UE is complete.

The scheduling component 1008 may activate a second sleep mode of the first UE based at least in part on transmitting the other signal.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a first UE, comprising: transmitting information indicating a set of resources associated with periodic sidelink monitoring, the information indicating at least one first period of time during which the first UE will remain awake and monitor for signals and at least one second period of time during which the first UE will be in a sleep mode and not monitoring for signals, and monitoring, using at least one resource indicated by the information and during the at least one first period of time, for signals.

Aspect 2: The method of Aspect 1, further comprising: receiving, during a particular period of time of the at least one first period of time, and from a second UE, a sidelink WUS, and extending a duration of the particular period of time based at least in part on receiving the sidelink WUS.

Aspect 3: The method of Aspect 2, wherein the sidelink WUS indicates an identifier of the first UE.

Aspect 4: The method of any of Aspects 2 or 3, wherein the sidelink WUS indicates a threshold period time for the first UE to provide a sidelink WUS response.

Aspect 5: The method of any of Aspects 2-4, further comprising: transmitting, to the second UE, a sidelink WUS response indicating that the first UE is ready to receive data from the second UE.

Aspect 6: The method of Aspect 5, wherein the sidelink WUS response further indicates one or more resources that are unavailable for receiving transmissions from the second UE.

Aspect 7: The method of any of Aspects 5 or 6, wherein the sidelink WUS response further indicates one or more resources that are available for receiving transmissions from the second UE.

Aspect 8: The method of any of Aspects 5-7, wherein the sidelink WUS response indicates that the first UE has data to be transmitted to the second UE.

Aspect 9: The method of any of Aspects 1-8, further comprising: receiving, from a second UE, a buffer status report indicating an amount of data to be transmitted from the second UE to the first UE.

Aspect 10: The method of Aspect 9, further comprising: determining, based at least in part on the buffer status report, a sleep time associated with the first UE activating the sleep mode; and activating the sleep mode based at least in part on the sleep time.

Aspect 11: The method of any of Aspects 1-10, further comprising: receiving, from a second UE, another signal indicating transmission of data from the second UE to the first UE is complete; and activating the sleep mode based at least in part on the other signal.

Aspect 12: The method of any of Aspects 1-11, wherein the set of resources is one of a plurality of different sets of periodic resources.

Aspect 13: The method of any of Aspects 1-12, wherein the set of resources is associated with a particular receive beam of the first UE.

Aspect 14: The method of any of Aspects 1-13, further comprising: alternating between the sleep mode and an awake mode based at least in part on the set of resources.

Aspect 15: A method of wireless communication performed by a first UE, comprising: receiving information indicating a set of resources associated with periodic sidelink monitoring, the information indicating at least one first period of time during which a second UE will remain awake and monitor for signals and at least one second period of time during which the second UE will be in a sleep mode and not monitoring for signals, and transmitting, during a particular period of time of the at least one first period of time, and to the second UE, a sidelink WUS.

Aspect 16: The method of Aspect 15, wherein the sidelink WUS indicates an identifier of the second UE.

Aspect 17: The method of any of Aspects 15 or 16, further comprising:
  receiving, from the second UE, a sidelink WUS response indicating that the second UE is ready to receive data from the first UE.

Aspect 18: The method of Aspect 17, further comprising: transmitting, to the second UE and based at least in part on receiving the sidelink WUS response, data.

Aspect 19: The method of any of Aspects 17 or 18, wherein the sidelink WUS response further indicates one or more resources that are unavailable for receiving transmissions from the first UE.

Aspect 20: The method of any of Aspects 17-19, wherein the sidelink WUS response further indicates one or more resources that are available for receiving transmissions from the first UE.

Aspect 21: The method of any of Aspects 17-20, wherein the sidelink WUS response indicates that the second UE has data to be transmitted to the first UE.

Aspect 22: The method of any of Aspects 15-21, wherein the sidelink WUS indicates a threshold period time for the second UE to provide a sidelink WUS response.

Aspect 23: The method of any of Aspects 15-22, further comprising:
  transmitting, to the second UE, a buffer status report indicating an amount of data to be transmitted from the first UE to the second UE.

Aspect 24: The method of any of Aspects 15-23, further comprising:
  transmitting, to the second UE, another signal indicating transmission of data from the first UE to the second UE is complete; and activating a second sleep mode of the first UE based at least in part on transmitting the other signal.

Aspect 25: The method of any of Aspects 15-24, wherein the set of resources is one of a plurality of different sets of periodic resources.

Aspect 26: The method of any of Aspects 15-25, wherein the set of resources is associated with a particular receive beam of the second UE.

Aspect 27: An apparatus for wireless communication at a device, comprising a processor; memory coupled with the processor; and instructions stored in the memory and executable by the processor to cause the apparatus to perform the method of one or more of Aspects 1-14.

Aspect 28: An apparatus for wireless communication at a device, comprising a processor; memory coupled with the processor; and instructions stored in the memory and executable by the processor to cause the apparatus to perform the method of one or more of Aspects 15-26.

Aspect 29: A device for wireless communication, comprising a memory and one or more processors coupled to the memory, the one or more processors configured to perform the method of one or more of Aspects 1-14.

Aspect 30: A device for wireless communication, comprising a memory and one or more processors coupled to the memory, the one or more processors configured to perform the method of one or more of Aspects 15-26.

Aspect 31: An apparatus for wireless communication, comprising at least one means for performing the method of one or more of Aspects 1-14.

Aspect 32: An apparatus for wireless communication, comprising at least one means for performing the method of one or more of Aspects 15-26.

Aspect 33: A non-transitory computer-readable medium storing code for wireless communication, the code comprising instructions executable by a processor to perform the method of one or more of Aspects 1-14.

Aspect 34: A non-transitory computer-readable medium storing code for wireless communication, the code comprising instructions executable by a processor to perform the method of one or more of Aspects 15-26.

Aspect 35: A non-transitory computer-readable medium storing a set of instructions for wireless communication, the set of instructions comprising one or more instructions that, when executed by one or more processors of a device, cause the device to perform the method of one or more of Aspects 1-14.

Aspect 36: A non-transitory computer-readable medium storing a set of instructions for wireless communication, the set of instructions comprising one or more instructions that, when executed by one or more processors of a device, cause the device to perform the method of one or more of Aspects 15-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
   one or more memories; and
   one or more processors, coupled to the one or more memories, configured to:
      transmit information indicating a set of resources associated with periodic sidelink monitoring,
         the information indicating at least one first period of time during which the first UE will remain awake and monitor for signals and at least one second period of time during which the first UE will be in a sleep mode and not monitoring for signals; and
      receive, during a particular period of time of the at least one first period of time, and from a second UE, a sidelink wake-up signal (WUS), the sidelink WUS indicating a threshold period time for the first UE to provide a sidelink WUS response.

2. The first UE of claim 1, wherein the one or more processors are further configured to:
   extend a duration of the particular period of time based at least in part on receiving the sidelink WUS.

3. The first UE of claim 2, wherein the sidelink WUS indicates an identifier of the first UE.

4. The first UE of claim 2, wherein the one or more processors are further configured to:
   transmit, to the second UE, the sidelink WUS response indicating that the first UE is ready to receive data from the second UE.

5. The first UE of claim 4, wherein the sidelink WUS response further indicates one or more resources that are unavailable for receiving transmissions from the second UE.

6. The first UE of claim 4, wherein the sidelink WUS response further indicates one or more resources that are available for receiving transmissions from the second UE.

7. The first UE of claim 4, wherein the sidelink WUS response indicates that the first UE has data to be transmitted to the second UE.

8. The first UE of claim 1, wherein the one or more processors are further configured to:
   receive, from a second UE, a buffer status report indicating an amount of data to be transmitted from the second UE to the first UE.

9. The first UE of claim 8, wherein the one or more processors are further configured to:
   determine, based at least in part on the buffer status report, a sleep time associated with the first UE activating the sleep mode; and
   activate the sleep mode based at least in part on the sleep time.

10. The first UE of claim 1, wherein the one or more processors are further configured to:
    receive, from a second UE, another signal indicating transmission of data from the second UE to the first UE is complete; and
    activate the sleep mode based at least in part on the other signal.

11. The first UE of claim 1, wherein the set of resources is one of a plurality of different sets of periodic resources.

12. The first UE of claim 1, wherein the set of resources is associated with a particular receive beam of the first UE.

13. The first UE of claim 1, wherein the one or more processors are further configured to:
    alternate between the sleep mode and an awake mode based at least in part on the set of resources.

14. A first user equipment (UE) for wireless communication, comprising:
    one or more memories; and
    one or more processors, coupled to the one or more memories, configured to:
       receive information indicating a set of resources associated with periodic sidelink monitoring,
          the information indicating at least one first period of time during which a second UE will remain awake and monitor for signals and at least one second period of time during which the second UE will be in a sleep mode and not monitoring for signals; and
       transmit, during a particular period of time of the at least one first period of time, and to the second UE, a sidelink wake-up signal (WUS), the sidelink WUS indicating a threshold period time for the second UE to provide a sidelink WUS response.

15. The first UE of claim 14, wherein the sidelink WUS indicates an identifier of the second UE.

16. The first UE of claim 14, wherein the one or more processors are further configured to:
    receive, from the second UE, the sidelink WUS response indicating that the second UE is ready to receive data from the first UE.

17. The first UE of claim 16, wherein the one or more processors are further configured to:
transmit, to the second UE and based at least in part on receiving the sidelink WUS response, data.

18. The first UE of claim 16, wherein the sidelink WUS response further indicates one or more resources that are unavailable for receiving transmissions from the first UE.

19. The first UE of claim 16, wherein the sidelink WUS response further indicates one or more resources that are available for receiving transmissions from the first UE.

20. The first UE of claim 16, wherein the sidelink WUS response indicates that the second UE has data to be transmitted to the first UE.

21. The first UE of claim 14, wherein the one or more processors are further configured to:
transmit, to the second UE, a buffer status report indicating an amount of data to be transmitted from the first UE to the second UE.

22. The first UE of claim 14, wherein the one or more processors are further configured to:
transmit, to the second UE, another signal indicating transmission of data from the first UE to the second UE is complete; and
activate a second sleep mode of the first UE based at least in part on transmitting the other signal.

23. The first UE of claim 14, wherein the set of resources is one of a plurality of different sets of periodic resources.

24. The first UE of claim 14, wherein the set of resources is associated with a particular receive beam of the second UE.

25. A method of wireless communication performed by a first user equipment (UE), comprising:
transmitting information indicating a set of resources associated with periodic sidelink monitoring,
the information indicating at least one first period of time during which the first UE will remain awake and monitor for signals and at least one second period of time during which the first UE will be in a sleep mode and not monitoring for signals; and
receiving, during a particular period of time of the at least one first period of time, and from a second UE, a sidelink wake-up signal (WUS), the sidelink WUS indicating a threshold period time for the first UE to provide a sidelink WUS response.

26. The method of claim 25, further comprising:
extending a duration of the particular period of time based at least in part on receiving the sidelink WUS.

27. The method of claim 25, wherein the sidelink WUS response is associated with at least one of:
one or more resources that are available for receiving transmissions from the second UE, or
one or more resources that are unavailable for receiving transmissions from the second UE.

28. A method of wireless communication performed by a first user equipment (UE), comprising:
receiving information indicating a set of resources associated with periodic sidelink monitoring,
the information indicating at least one first period of time during which a second UE will remain awake and monitor for signals and at least one second period of time during which the second UE will be in a sleep mode and not monitoring for signals; and
transmitting, during a particular period of time of the at least one first period of time, and to the second UE, a sidelink wake-up signal (WUS), the sidelink WUS indicating a threshold period time for the second UE to provide a sidelink WUS response.

29. The method of claim 28, further comprising:
receiving, from the second UE, the sidelink WUS response indicating that the second UE is ready to receive data from the first UE; and
transmitting, to the second UE and based at least in part on receiving the sidelink WUS response, data.

30. The method of claim 28, further comprising:
transmitting, to the second UE, another signal indicating transmission of data from the first UE to the second UE is complete.

* * * * *